(12) United States Patent
Miyazawa

(10) Patent No.: US 9,681,019 B2
(45) Date of Patent: Jun. 13, 2017

(54) CONTROL DEVICE AND IMAGE PROCESSING SYSTEM

(71) Applicant: BROTHER KOGYO KABUSHIKI KAISHA, Nagoya-shi, Aichi-ken (JP)

(72) Inventor: Masafumi Miyazawa, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/867,650

(22) Filed: Sep. 28, 2015

(65) Prior Publication Data

US 2016/0094753 A1 Mar. 31, 2016

(30) Foreign Application Priority Data

Sep. 30, 2014 (JP) ................. 2014-200238

(51) Int. Cl.
  *G06F 3/12* (2006.01)
  *H04N 1/00* (2006.01)
  *H04N 1/32* (2006.01)
  *H04N 1/44* (2006.01)
  *G06K 15/02* (2006.01)

(52) U.S. Cl.
  CPC ......... *H04N 1/32101* (2013.01); *G06F 3/125* (2013.01); *G06F 3/1206* (2013.01); *G06F 3/1222* (2013.01); *G06F 3/1238* (2013.01); *G06F 3/1287* (2013.01); *H04N 1/00244* (2013.01); *H04N 1/00392* (2013.01); *H04N 1/00411* (2013.01); *H04N 1/4413* (2013.01); *H04N 2201/0094* (2013.01); *H04N 2201/3226* (2013.01); *H04N 2201/3232* (2013.01); *H04N 2201/3239* (2013.01)

(58) Field of Classification Search
  None
  See application file for complete search history.

(56) References Cited

U.S. PATENT DOCUMENTS

| 8,549,435 | B1* | 10/2013 | Bushore | G06F 17/24 715/769 |
| 2002/0012453 | A1* | 1/2002 | Hashimoto | H04N 1/00236 382/112 |
| 2002/0051195 | A1* | 5/2002 | Arakawa | H04N 1/00957 358/1.15 |
| 2005/0134947 | A1* | 6/2005 | Tsue | G06T 11/60 358/537 |
| 2006/0066905 | A1* | 3/2006 | Takashima | G06F 17/248 358/1.18 |

(Continued)

FOREIGN PATENT DOCUMENTS

| JP | 8-289133 A | 11/1996 |
| JP | 2000-270148 A | 9/2000 |

*Primary Examiner* — Beniyam Menberu
(74) *Attorney, Agent, or Firm* — Merchant & Gould P.C.

(57) ABSTRACT

A control device is configured to: control the scanner unit, when a first instruction is received from a user to insert a first scanned data in a first file stored in a file storage server, to scan a document to generate the first scanned data; and to provide a first insertion request to the file storage server through a communication interface, the first insertion request requesting the file storage server to insert the first scanned data at a target location in the first file, the target location being a location designated by the user through a terminal device that is configured separately from the control device.

15 Claims, 11 Drawing Sheets

(56) References Cited

U.S. PATENT DOCUMENTS

| | | | |
|---|---|---|---|
| 2009/0213405 A1* | 8/2009 | Eguchi | G06Q 30/00 358/1.13 |
| 2010/0188674 A1* | 7/2010 | Tomizawa | G06K 9/00979 358/1.9 |
| 2010/0214629 A1* | 8/2010 | Patterson | H04N 1/00222 358/474 |
| 2012/0137208 A1* | 5/2012 | Ito | H04N 1/00204 715/234 |
| 2013/0055069 A1* | 2/2013 | Seo | G06F 17/211 715/234 |
| 2013/0141744 A1* | 6/2013 | Saito | H04N 1/4426 358/1.13 |
| 2013/0208302 A1* | 8/2013 | Tanaka | H04N 1/00228 358/1.15 |

* cited by examiner

FIG. 5
(CASE A OR D OF FIRST EMBODIMENT), (CASE F OF SECOND EMBODIMENT), AND (CASE G OF THIRD EMBODIMENT)
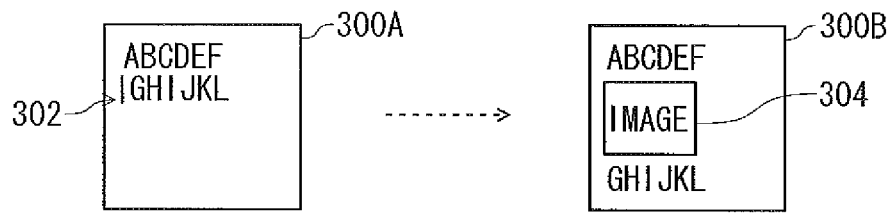
(CASE B OF FIRST EMBODIMENT)
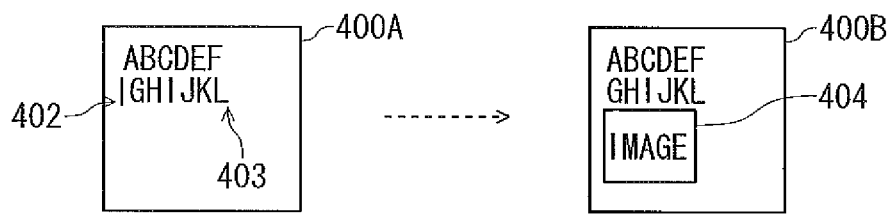
(CASE C OF FIRST EMBODIMENT)
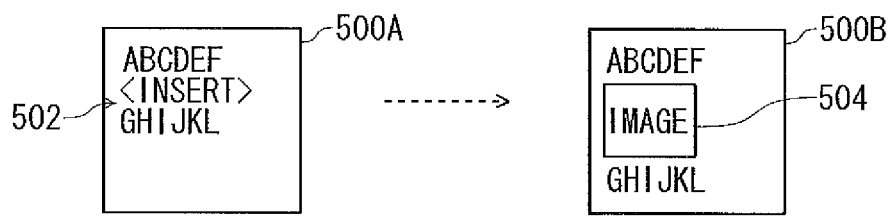
(CASE E OF FIRST EMBODIMENT)
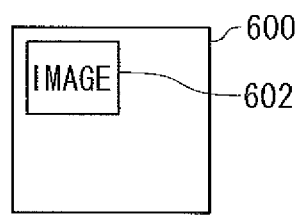
(NEW FILE GENERATION)

(CASE B OF FIRST EMBODIMENT)

(CASE C OF FIRST EMBODIMENT)

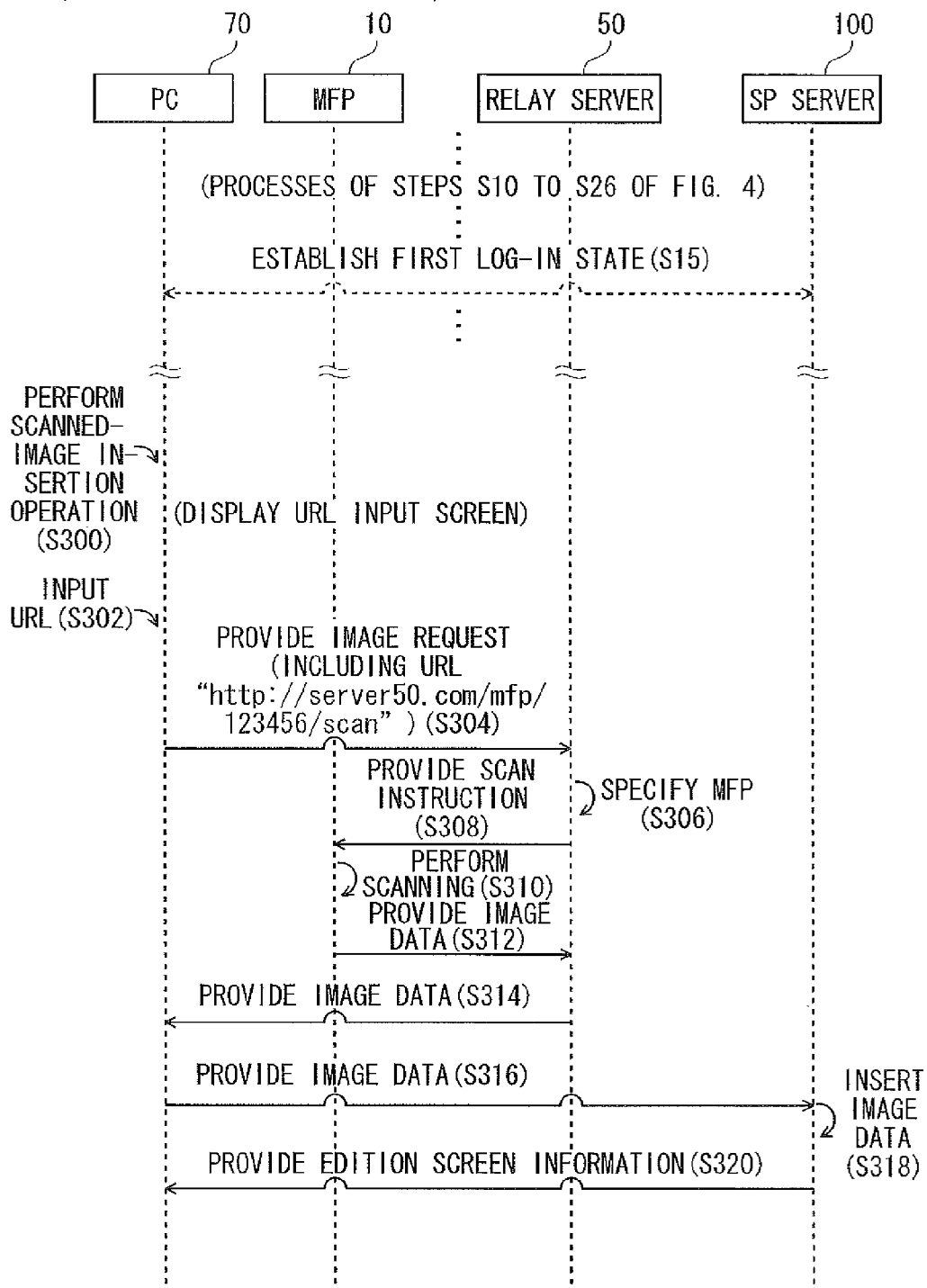

CONTROL DEVICE AND IMAGE PROCESSING SYSTEM

CROSS-REFERENCE TO RELATED APPLICATION

This application claims priorities from Japanese Patent Application No. 2014-200238 filed on Sep. 30, 2014, the entire subject matters of which is incorporated herein by reference.

TECHNICAL FIELD

The present disclosure relates to a control device for controlling a scanner unit and to a system including a terminal device and a control device.

BACKGROUND

In the related art, an image processing apparatus is configured to acquire a file from a PC, and insert copy image data in an insertion area in the corresponding file when a scanner unit acquires the copy image data by scanning a document. According to this configuration, since an edit screen is displayed on an operation panel of the image processing apparatus, a user is allowed to designate the insertion area in a file by operating the operation panel while viewing the edit screen.

Operation panels of image processing apparatuses such as a scanner and a multi-function apparatus are generally smaller than those of terminal devices such as a PC.

SUMMARY

There is a possibility that the user cannot easily perform the designation of the insertion area in which a user is required to designate the insertion area using the operation panel of the image processing apparatus.

The present disclosure has been made in view of the above circumstances, and one of objects of the present disclosure is to provide a configuration enabling a user to easily perform insertion of scanned data in a file.

According to an illustrative embodiment of the present disclosure, there is provided a control device for controlling a scanner unit, the control device including: a communication interface configured to be connectable with a network and establishes communication with a file storage server through the network; a processor; and memory storing computer readable instructions that, when executed by the processor, causing the control device to perform: scanning control processing of controlling the scanner unit, when a first instruction is received from a user to insert a first scanned data in a first file stored in the file storage server, to scan a document to generate the first scanned data; and insertion request providing processing of providing a first insertion request to the file storage server through the communication interface, the first insertion request requesting the file storage server to insert the first scanned data at a target location in the first file, the target location being a location designated by the user through a terminal device that is configured separately from the control device.

According to another illustrative embodiment of the present disclosure, there is provided an image processing system including: a terminal device; and a control device that is configured separately from the terminal device, wherein the terminal device includes: a user interface that receives a command input by a user; a first communication interface configured to be connectable with a network and establishes communication with a file storage server through a network; a first processor; and first memory storing computer readable instructions that, when executed by the first processor, causing the terminal device to perform: accessing processing of accessing a target file stored in the file storage server through the first communication interface with a predetermined user information; and designating processing of designating a target location in the target file, when the user interface receives an edit operation input by the user for instructing editing of the target file through the user interface, in a state where the terminal device is accessing the target file, and wherein the control device includes: a second communication interface configured to be connectable with the network and establishes communication with the file storage server and the terminal through the network; a second processor; and second memory storing computer readable instructions that, when executed by the second processor, causing the control device to perform: scanning control processing of controlling a scanner to scan a document to generate target scanned data; and first scanned data providing processing of providing the target scanned data to the file storage server through the second communication interface for inserting the target scanned data at the target location in the target file.

According to still another illustrative embodiment of the present disclosure, there is provided a non-transitory computer readable recording medium storing computer readable instructions for a control device that controls a scanner unit and provided with a communication interface and a processor, wherein the instructions, when executed by the processor, causing the control device to perform: scanning control processing of controlling the scanner unit, when a first instruction is received from a user to insert a first scanned data in a first file stored in the file storage server, to scan a document to generate the first scanned data; and insertion request providing processing of providing a first insertion request to the file storage server through the communication interface, the first insertion request requesting the file storage server to insert the first scanned data at a target location in the first file, the target location being a location designated by the user through a terminal device that is configured separately from the control device.

BRIEF DESCRIPTION OF THE DRAWINGS

In the accompanying drawings:

FIG. 5 shows transitions of edit screens when image data is inserted;

FIG. 11 shows a sequence diagram of a case G of inserting image data in a file.

DETAILED DESCRIPTION

Figure 1:
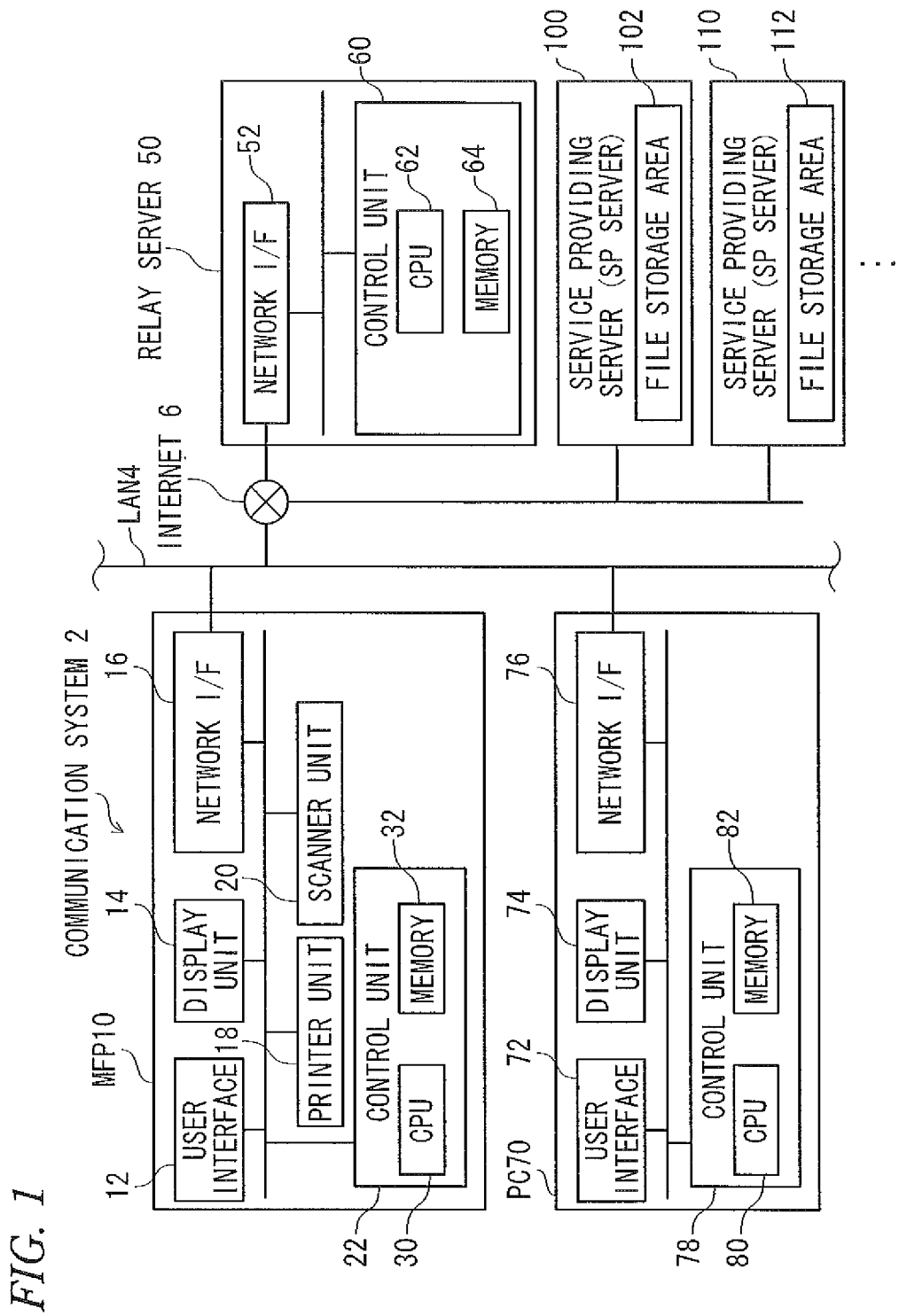
FIG. 1 shows an exemplary configuration of a communication system according to an embodiment of the present disclosure.

A first embodiment according to the present disclosure will be described in detail. FIG. 1 shows a communication system 2 according to the first embodiment. As shown in FIG. 1, the communication system 2 includes an MFP (an abbreviation for Multi-Function Peripheral) 10, a relay server 50, a PC (an abbreviation for Personal Computer) 70, and a plurality of service providing servers (hereinafter, referred to as SP (an abbreviation for Service Provider) servers) 100 and 110. The MFP 10 and the PC 70 are connected to a LAN (an abbreviation for Local Area Network) 4. The relay server 50 and the plurality of SP servers 100 and 110 are connected to the Internet 6.

The MFP 10 is configured to perform multiple functions such as a printing function, a scanning function, a copying function, and a facsimile function. Further, the MFP 10 is configured to perform a scan uploading function (hereinafter, referred to as "scan UL function") of uploading image data, which is generated by scanning of the MFP 10, to the SP server 100 or 110. Furthermore, the MFP 10 is configured to perform a downloading print function (hereinafter, referred to as "DL print function") of downloading image data from the SP server 100 or 110 and printing an image represented by the corresponding image data.

The MFP 10 includes a user interface 12, a display unit 14, a network interface 16, a printer unit 18, a scanner unit 20, and a control unit 22. The user interface 12 is provided with a plurality of keys. Hereinafter, an interface will be referred to as an "I/F". A user can input a variety of instructions to the MFP 10 by operating the user interface 12. The display unit 14 is a display for displaying a variety of information. The user interface 12 and the display unit 14 may be modified to be configured as a touch panel. In this modification, the user interface 12 and the display unit 14 may be configured as one hardware unit. The network I/F 16 is connected to the LAN 4. The printer unit 18 is a printing mechanism of an inkjet type, a laser type, or the like. The scanner unit 20 is a scanning mechanism such as a CCD (an abbreviation for Charge Coupled Disarmament) or a CIS (an abbreviation for Contact Image Sensor).

The control unit 22 is provided with a CPU 30 and a memory 32. The CPU 30 performs various processes according to programs stored in the memory 32. Although not shown, the memory 32 stores a user ID (an abbreviation for Identification Data) and a password in addition to the above described programs. The user ID and the password are stored in the memory 32 in advance by the user. The user ID is identification information representing the user. The password is authentication information for accessing the SP server 100 or 110. The user ID and the password are stored in advance in the memory 32 during advance preparation (to be described below) by the user.

The relay server 50 is a server for relaying service provided by the SP server 100 or 110 to the MFP 10. The relay server 50 is a server which is provided by the vendor of the MFP 10. The relay server 50 includes a network I/F 52 and a control unit 60. The network I/F 52 is connected to the Internet 6.

The control unit 60 is provided with a CPU 62 and a memory 64. The CPU 62 performs various processes according to programs stored in the memory 64. The memory 64 stores a variety of information besides the above described programs.

The PC 70 is a terminal device such as a desktop PC or a laptop PC. The PC 70 is an example of a terminal device which is set up by the same user (hereinafter, referred to simply as "user") as the user of the MFP 10. The PC 70 includes a user interface 72, a display unit 74, a network I/F 76, and a control unit 78. The user interface 72 includes a keyboard and a mouse. The user can input various instructions to the PC 70 by operating the user interface 72. The display unit 74 is a display for displaying a variety of information. The network I/F 76 is connected to the LAN 4.

The control unit 78 is provided with a CPU 80 and a memory 82. The CPU 80 performs various processes according to programs stored in the memory 82. The memory 82 stores a variety of information besides the above described programs.

Each of the SP servers 100 and 110 is a publicly known cloud server such as Evernote (registered trademark of Evernote Corporation), Google Drive (registered trademark of Google.Inc.), PICASA (registered trademark of Lifescape, Inc.), and FACEBOOK (registered trademark of Facebook, Inc.). Each of the SP servers 100 and 110 can provide a service to various communication devices including the MFP 10 and PC 70. For example, the SP server 100 provides a file storing service of storing files accessible from the communication devices such as the PC 70 and the MFP 10. The SP servers 100 and 110 include file storage area 102 and 112 for storing files accessible from the communication devices, respectively. Also, each of the SP servers 100 and 110 can perform, for example, an image saving service of saving image data which are acquired from the MFP 10, in order for the MFP 10 to perform the scan UL function, besides the above described file storing service. Also, each of the SP servers 100 and 110 can perform, for example, an image providing service of providing image data to the MFP 10, in order for the MFP 10 to perform the DL print function.

Figure 2:
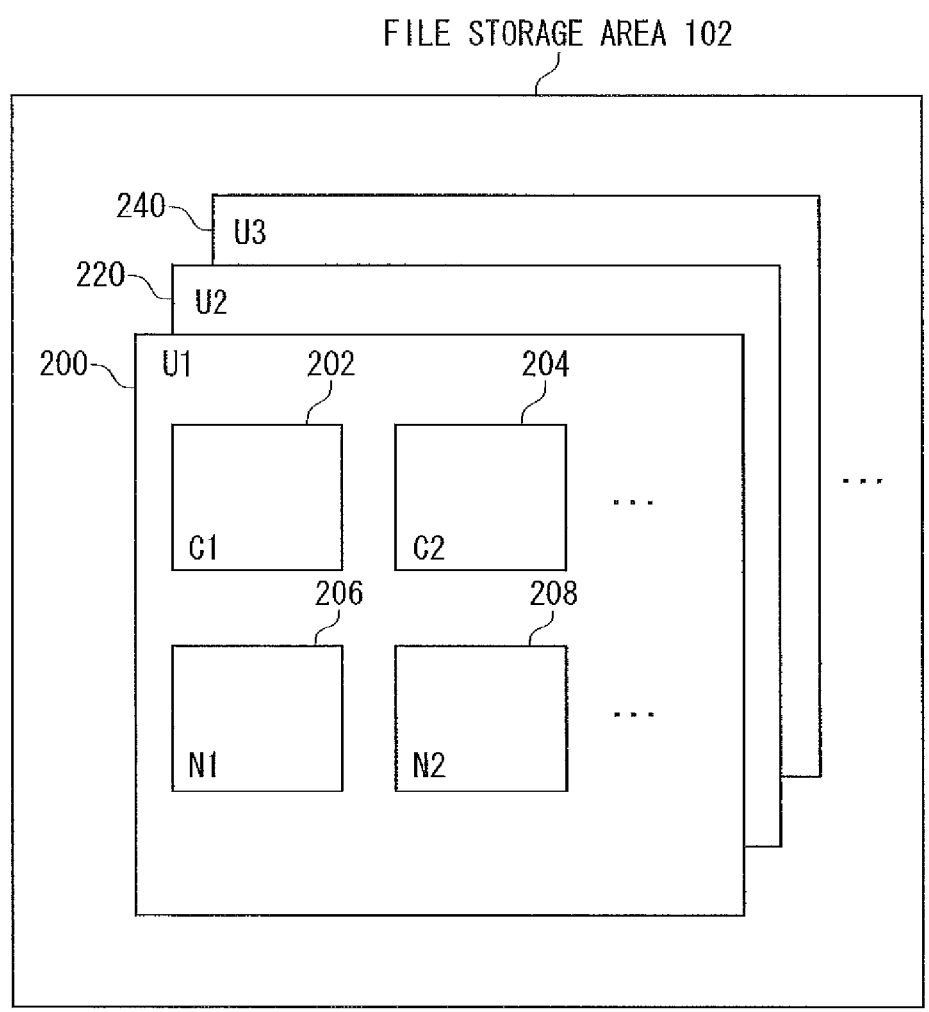
FIG. 2 shows an example of a file storage area.

As shown in FIG. 2, the file storage area 102 stores a plurality of file group 200, 220, and 240. The plurality of file groups 200, 220, and 240 is associated with user IDs (for example, "U1", "U2", and "U3"), respectively. In the example of FIG. 2, the file group 200 is associated with a user ID "U1". Also, the file group 200 includes a plurality of files 202, 204, and 206, 208 . . . stored by a user represented by the user ID "U1". The file group 200 includes first type files 202 and 204 (that is, files represented by icons including file names "C1" and "C2"), and second type files (that is, files represented by icons including file names "N1" and "N2") 206 and 208 having a format different from that of the first type files 202 and 204. Each of the first type files 202 and 204 is a file having a format which can be simultaneously accessed from a plurality of communication devices (for example, the PC 70 and the MFP 10) and can be edited by the plurality of individual communication devices at the same time. Each of the second type files 206 and 208 is a file having a format which cannot be edited by a communication device (for example, the MFP 10) while being edited by another communication device (for example, the PC 70). Also, although FIG. 2 shows an example of the file storage area 102 of the SP server 100, the file storage area 112 of the SP server 110 also has a substantially identical configuration.

Also, the SP server 100 is a server which is provided by a first service provider (that is, a first company), and the SP server 100 is a server which is provided by a second service provider (that is, a second company) different from the first service provider. The first service provider provides a first API (Application Program Interface) for receiving the service from the SP server 100, and the second service provider provides a second API for receiving the service from the SP server 110. Since the first service provider and the second service provider are different from each other, generally, the first API and the second API are different from each other. For example, in order to receive the services from both of the SP servers 100 and 110, each communication device may need to support both of the first and second APIs (that is, each communication device needs both programs for using the first API and a program for using the second API).

For example, in order for the MFP 10 to receive the service from each of the plurality of SP servers 100 and 110, the MFP 10 needs to support the plurality of APIs, and needs to store many programs. However, the storage capacity of the memory 32 of the MFP 10 is less than that of the PC 70 or the like. Therefore, in the present embodiment, in order to enable the MFP 10 to receive the service from each of the plurality of SP servers 100 and 110 without storing many programs in the MFP 10, the relay server 50 is provided. The relay server 50 supports the plurality of APIs for the plurality of SP servers 100 and 110. Therefore, in a situation where the MFP 10 needs to receive a service from a specific SP server (for example, the SP server 100) of the plurality of SP servers 100 and 110, the relay server 50 performs a variety of communication with the specific SP server, using an API for the specific SP server. Therefore, even though the MFP 10 does not support the API for the specific SP server, it can perform communication with the specific SP server about image data. That is, even though the MFP 10 stores many programs for using the plurality of APIs, it can receive the service from each of the plurality of SP servers 100 and 110.

In order to receive the services from the SP servers 100 and 110, the user of the MFP 10 and the PC 70 performs the following advance preparation. The user accesses the SP server 100, for example, using the PC 70. Subsequently, the user registers the user ID (for example, "U1") and the password of the user in the SP server 100 by operating the user interface 72 of the PC 70. Thereafter, the user stores the user ID and the password registered in the SP server 100, in the memory 32, in association with the server name of the SP server 100, by operating the user interface 12 of the MFP 10. Also, in the same way as described above, the user can access the SP server 110 and register the user ID and the password in the SP server 110 by use of the PC 70. Further, the user may store the user ID and the password registered in the SP server 110, in the memory 32, in association with the server name of the SP server 110 by operating the user interface 12 of the MFP 10. Hereinafter, the user ID and the password are also collectively referred to as user information.

Figure 3:
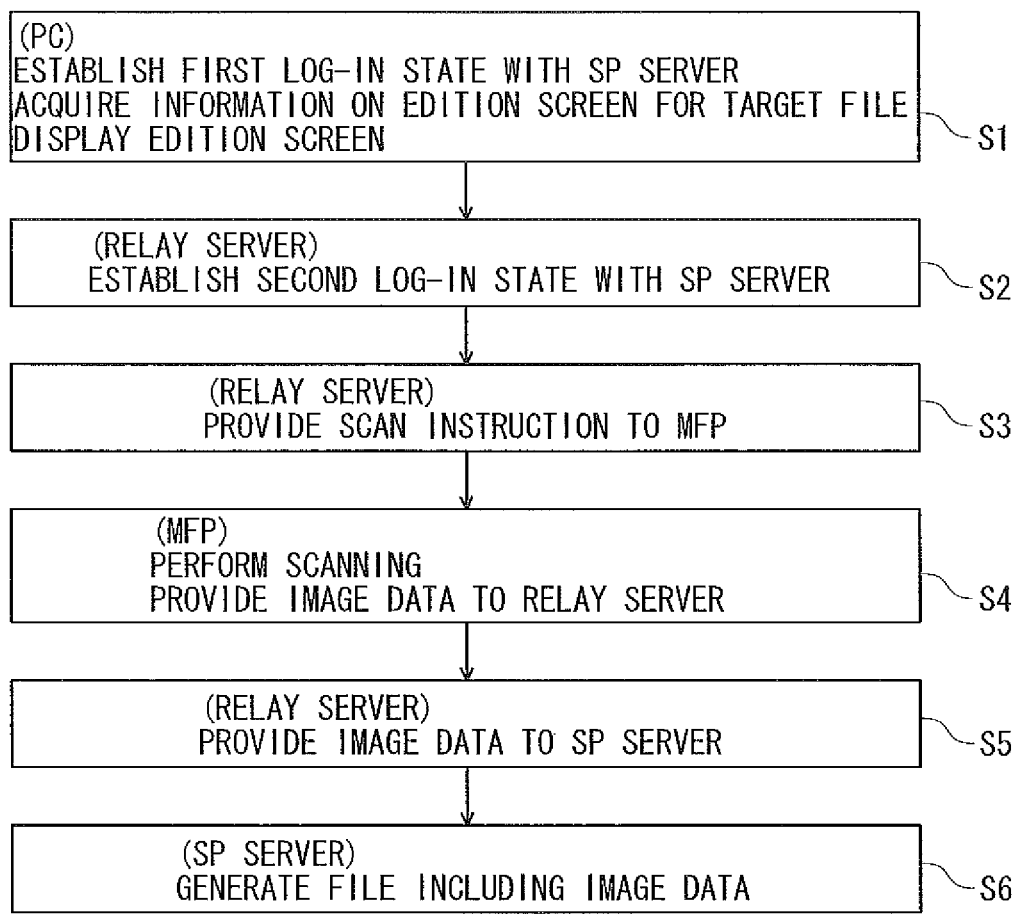
FIG. 3 is a block diagram for describing outlines of operations of individual devices of the communication system.

With reference to FIG. 3, outlines of operations of individual devices 10, 50, 70, 110, and 110 of the communication system 2 of the present embodiment will be described. In the present embodiment, in the communication system 2, operations of STEPS S1 to S6 are sequentially performed in general.

In STEP S1, the PC 70 establishes a first log-in state with the SP server 100 or 110 (see STEP S15 of FIGS. 4, 6, 7, and 8). Thereafter, if the user selects a file name using the user interface 72, the PC 70 acquires information on an edit screen for a file corresponding to the selected file name, and displays the edit screen on the display unit 74 (see STEPS S22 and S26).

In STEP S2, the relay server 50 establishes a second log-in state with the SP server 100 or 110 in response to an operation of the user on the user interface 12 of the MFP 10 (see STEP S47 of FIGS. 4, 6, 7, and 8). The relay server 50 acquires target position information representing a target file which is being edited in the PC 70 and an edit location of the target file, from the SP server 100 or 110.

Figure 7:
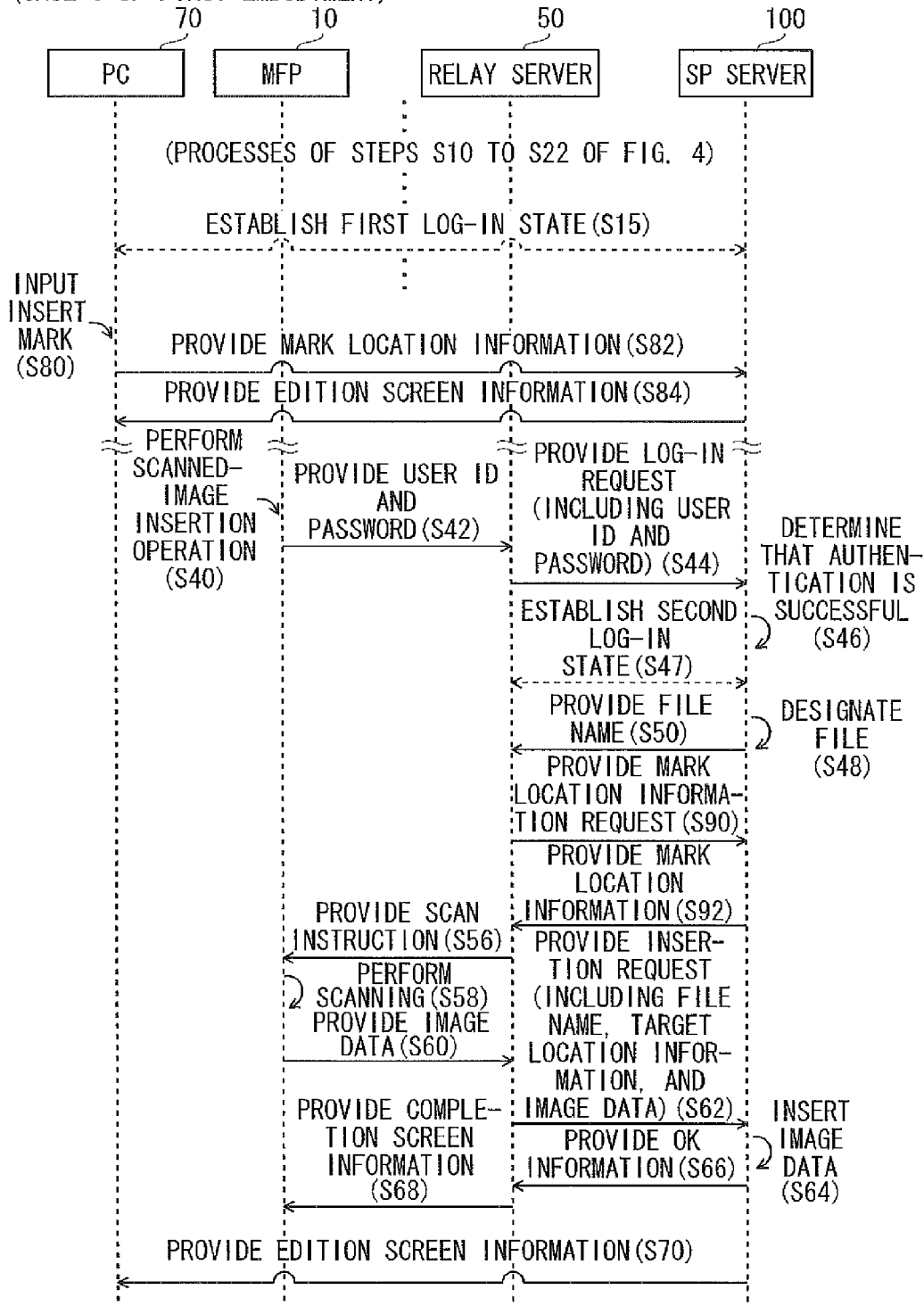
FIG. 7 shows a sequence diagram of a case C of inserting image data in a file.
Figure 8:
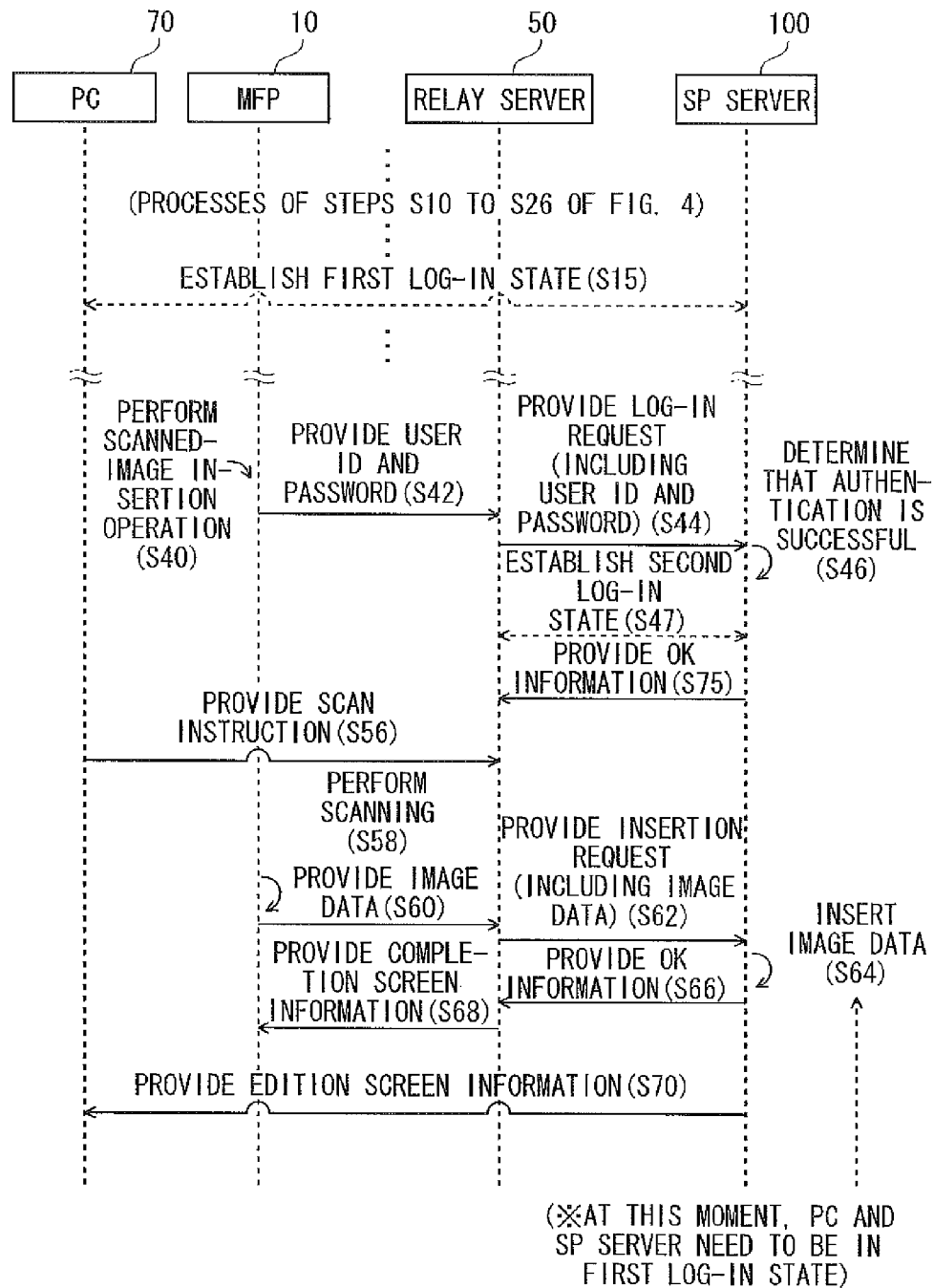
FIG. 8 shows a sequence diagram of a case D of inserting image data in a file.
Figure 9:
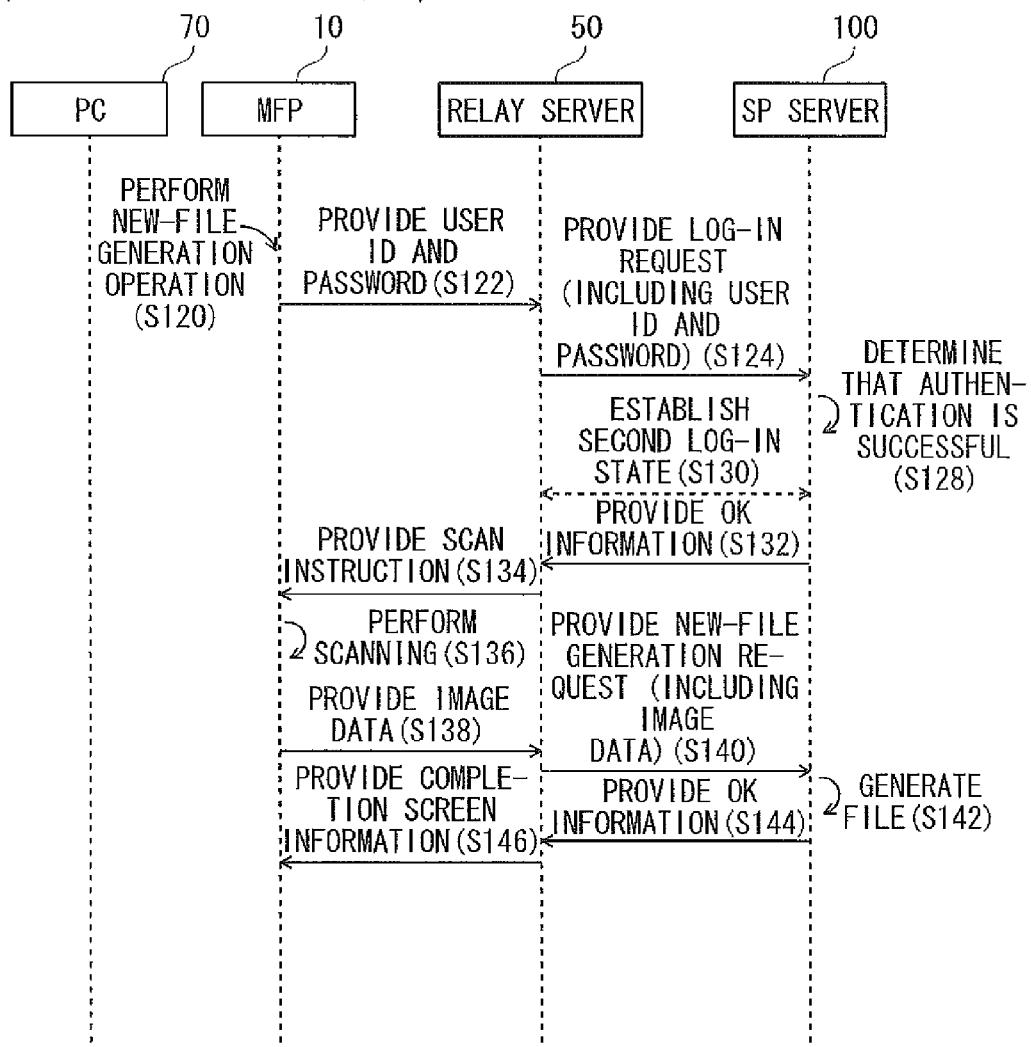
FIG. 9 shows a sequence diagram of a case E of newly generating a file having image data inserted therein.

In STEP S3, the relay server 50 provides a scan instruction to the MFP 10 (see STEP S56 of FIGS. 4, 6, 7, and 8 and STEP S134 of FIG. 9).

In STEP S4, the MFP 10 performs scanning, thereby generating image data, and provides the image data to the relay server 50 ((see STEPS S58 and S60 of FIGS. 4, 6, 7, and 8 and STEPS S136 and S138 of FIG. 9).

Figure 4:
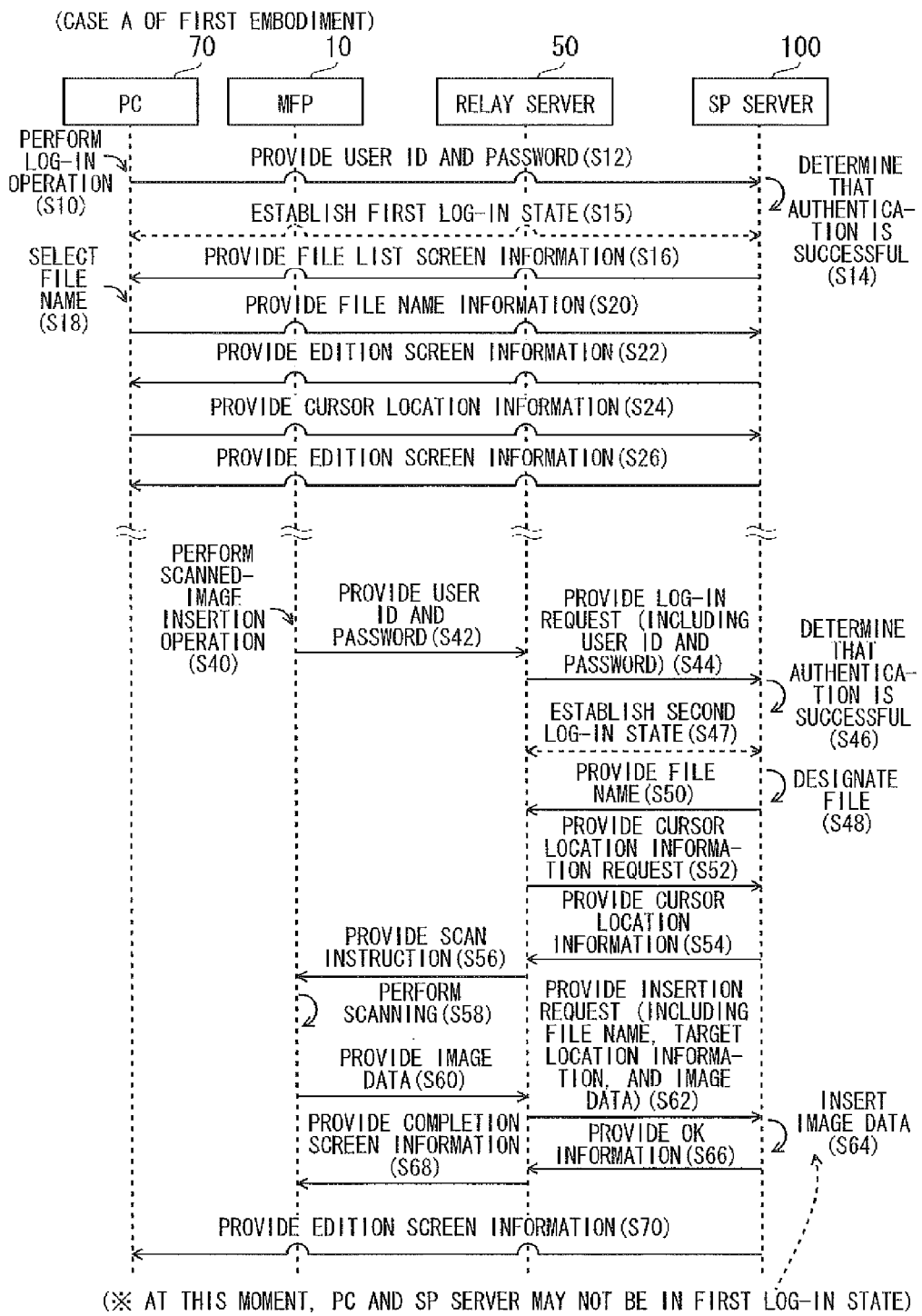
FIG. 4 shows a sequence diagram of a case A of inserting image data in a file.
Figure 6:
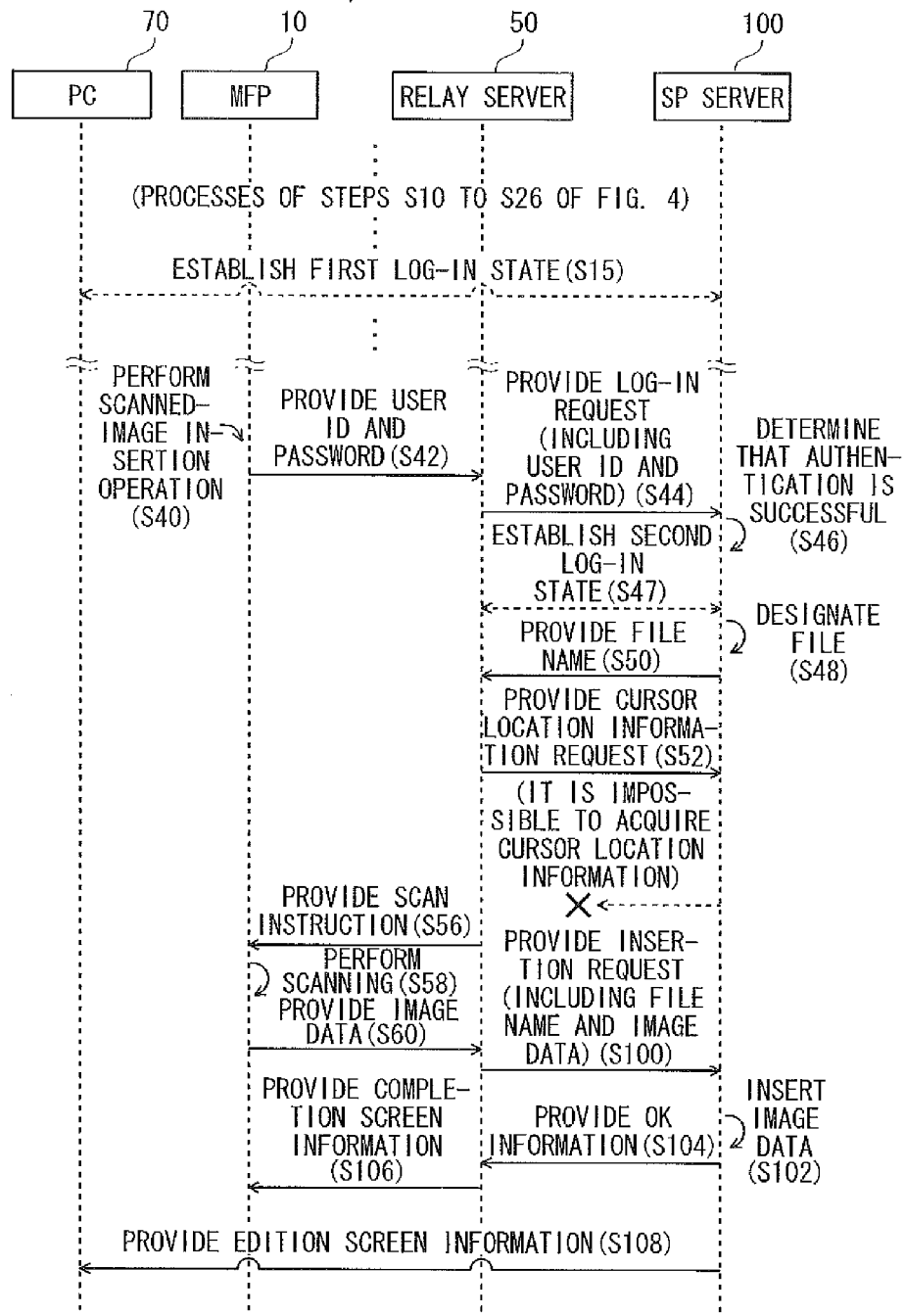
FIG. 6 shows a sequence diagram of a case B of inserting image data in a file.

In STEP S5, the relay server 50 issues an insertion request for inserting the image data at the edit location in the target file, to the SP server 100 or 110 (see STEP S62 of FIGS. 4, 7, and 8, STEP S100 of FIG. 6 and STEP S140 of FIG. 9).

In STEP S6, the SP server 100 or 110 generates a file including the image data (see STEP S64 of FIGS. 4, 7, and 8, STEP S102 of FIG. 6, and STEP S142 of STEP S9).

Subsequently, details of the processes of the individual devices described with reference to FIG. 3 will be described. FIG. 4 is an explanatory view of a case A for inserting image data in a file. Although not shown, first, the user performs an access operation for accessing the SP server 100 by operating the user interface 72 of the PC 70. In this case, the CPU 80 of the PC 70 accesses the SP server 100, using a WEB browser or the like of the PC 70. In this case, the SP server 100 provides information on a log-in screen to the PC 70.

If the CPU 80 of the PC 70 acquires the log-in screen information from the SP server 100, the CPU controls the display unit 74 such that the display displays the log-in screen. Although not shown, the log-in screen includes fields for inputting the user ID and the password of the user.

In STEP S10, the user performs a predetermined log-in operation on the log-in screen by operating the user interface 72 of the PC 70. The log-in operation includes an operation for inputting the user ID (for example, "U1") and the password on the log-in screen. In this case, in STEP S12 subsequent to STEP S10, the CPU 80 of the PC 70 provides the input user information (that is, the user ID and the password) to the SP server 100. Hereinafter, user information which is provided to the SP server 100 in STEP S12 will also be referred to as "specific user information".

When the SP server 100 acquires the specific user information, it performs authentication using the acquired specific user information. In a case where the acquired specific user information has been already registered in the SP server 100, the SP server 100 determines that the authentication is successful. In STEP S14, the SP server 100 determines that the authentication is successful.

Therefore, in STEP S15, the CPU 80 of the PC 70 establishes a first log-in state with the SP server 100.

Subsequently, in STEP S16, the SP server 100 provides file list screen information to the PC 70. Specifically, in STEP S16, first, the SP server 100 specifies a file group (for example, the file group 200 of FIG. 2) including the user ID (for example, "U1") included in the specific user information acquired in the PC 70, from the file storage area 102. Subsequently, the SP server 100 generates file list screen information including the file names of one or more files (for example, the files 202 and 204) included in the specified file group, and provides the generated file list screen information to the PC 70.

When the CPU 80 of the PC 70 acquires the file list screen information from the SP server 100, the CPU controls the display unit 74 such that the display unit displays a file list screen represented by the file list screen information.

Although not shown, the file list screen includes the file names (for example, "C1" and "C2") of one or more files (for example, the files 202 and 204 of FIG. 3) corresponding to the user ID (for example, "U1") input in STEP S10 by the user. In STEP S18, the user selects one file name included in the file list screen by operating the user interface 72. In this case A, an example in which, in STEP S18, the user selects the file name (for example, "C1") of a first type file (for example, the file 202 of FIG. 2) will be described. In this case, in STEP S20, the CPU 80 provides file name information representing the file name (for example, "C1") selected in STEP S18, to the SP server 100.

When the SP server 100 acquires the file name information from the PC 70, in STEP S22, the SP server 100 specifies a file (hereinafter, also referred to as an "target file") having the file name represented by the acquired file name information, from the file storage area 102, and provides edit screen information for the specified target file, to the PC 70.

When the CPU 80 of the PC 70 acquires the edit screen information from the SP server 100, the CPU controls the display unit 74 such that the display unit displays an edit screen 300A of FIG. 5 represented by the edit screen information. The edit screen 300A includes a character string "ABCDEF" in the first line, and a character string "GHIJKL" in the second line. Further, the edit screen 300A includes a cursor 302. In the edit screen 300A of FIG. 5, the cursor 302 is located at the beginning of the character string of the second line (that is, before "G"). Subsequently, in STEP S24, the CPU 80 provides cursor location information representing the location of the cursor 302 on the edit screen 300A, to the SP server 100.

When the SP server 100 acquires the cursor location information, in STEP S26, it provides edit screen information reflecting the cursor location represented by the cursor location information, to the PC 70.

When the CPU 80 of the PC 70 acquires the edit screen information from the SP server 100, the CPU controls the display unit 74 such that the discharge unit displays the edit screen 300A. Thereafter, whenever the user issues an instruction for changing the location of the cursor 302 by operating the user interface 72, the CPU 80 provides cursor location information to the SP server 100 (STEP S24), and acquires edit screen information reflecting the location of the cursor, from the SP server 100 (STEP S26). That is, the CPU 80 provides cursor location information representing the location of the cursor 302 on the edit screen 300A displayed on the display unit 74, to the SP server 100, in real time.

In the state where the PC 70 and the SP server 100 are in the first log-in state and the edit screen 300A for the target file is being displayed on the display unit 74, in STEP S40, the user performs a scanned-image insertion operation for inserting image data, which is generated by scanning a document, in the target file, by operating the user interface 12 of the MFP 10. The scanned-image insertion operation includes an operation for selecting the user information (that is, the user ID and the password) stored in the memory 32 by the user during the advance preparation. In STEP S40, the user selects the same user information as the specific user information provided to the SP server 100 in the above described STEP S12.

In this case, in STEP S42, the CPU 30 of the MFP 10 provides operation information of the scanned-image insertion operation to the relay server 50.

When the relay server 50 acquires the operation information from the MFP 10, in STEP S44, the relay server provides a log-in request including the specific user information included in the operation information. Also, the relay server 50 provides a request for the name of the file which is in progress of editing and is associated with the specific user information, to the SP server 100.

When the SP server 100 acquires the specific user information from the relay server 50, it performs authentication using the acquired specific user information. Similarly in the above described STEP S14, in a case where the acquired specific user information has been already registered in the SP server 100, the SP server 100 determines that the authentication is successful. In this case A, the specific user information which the SP server 100 acquires from the relay server 50 in STEP S44 is identical to the specific user information which the SP server 100 acquires from the PC 70 in STEP S12. For this reason, even in STEP S46, the SP server 100 determines that the authentication is successful.

Therefore, in STEP S47, the CPU 62 of the relay server 50 establishes a second log-in state different from the first log-in state, with the SP server 100.

Subsequently, in STEP S48, the SP server 100 designates the file name of the target file. Specifically, in STEP S48, first, the SP server 100 specifies the PC 70 which is a communication device different from the relay server 50 and having established a log-in state (that is, the first log-in state), different from the second log-in state, with the SP server 100, by using the specific user information used during establishment of the second log-in state. Subsequently, the SP server 100 designates the file name (that is, "C1") of the target file which is being accessed by the specified PC 70. Subsequently, in STEP S50, the SP server 100 provides the file name designated in STEP S48, to the relay server 50.

When the CPU 62 of the relay server 50 acquires the file name of the target file from the SP server 100, in STEP S52, the CPU provides a cursor location information request for requesting cursor location information representing the location of the cursor, to the SP server 100.

When the SP server 100 acquires the cursor location information request from the relay server 50, in STEP S54, the SP server provides the cursor location information acquired from the PC 70 in STEP S24, to the relay server 50. Also, the cursor location information which is provided to the relay server 50 in STEP S54 represents the current location of the cursor 302 on the edit screen 300A (see FIG. 5) displayed on the display unit 74 of the PC 70.

The CPU 62 of the relay server 50 acquires the cursor location information. Subsequently, in STEP S56, the CPU 62 provides a scan instruction to the MFP 10.

When the CPU 30 of the MFP 10 acquires the scan instruction from the relay server 50, in STEP S58, the CPU controls the scanner unit 20 such that the scanner unit scans a document. As a result, image data is generated. Subsequently, in STEP S60, the CPU 30 provides the generated image data to the relay server 50.

When the CPU 62 of the relay server 50 acquires the image data from the MFP 10, in STEP S62, the CPU provides an insertion request for requesting that the image data should be inserted at the location of the cursor in the target file, to the SP server 100. The insertion request which is provided in STEP S62 includes the file name of the target file acquired in STEP S50, target location information designating a target location where the image data should be inserted, and the image data acquired in STEP S60. Here, the target location which is represented by the target location information is the cursor location which is represented by the cursor location information acquired in STEP S54.

The SP server 100 acquires the insertion request from the relay server 50. Subsequently, in STEP S64, the SP server 100 inserts the image data at the target location (that is, the location of the cursor 302 on the edit screen 300A of FIG. 5), which is represented by the target location information, in the target file. In this case, in STEP S66, the SP server 100 provides OK information representing that the insertion has been completed, to the relay server 50.

When the CPU 62 of the relay server 50 acquires the OK information, in STEP S68, the CPU provides completion screen information stored in advance in the memory 64, to the MFP 10.

When the CPU 30 of the MFP 10 acquires the completion screen information, the CPU controls the display unit 14 such that the display unit displays a completion screen represented by the completion screen information. The completion screen includes a message representing that the image data has been inserted in the target file. Therefore, the user can see that the image data has been inserted in the target file, by viewing the completion screen.

Also, when the image data insertion of STEP S64 is completed, in STEP S70, the SP server 100 provides edit screen information for the target file with the image data inserted therein, to the PC 70.

When the CPU 80 of the PC 70 acquires the edit screen information, the CPU controls the display unit 74 such that the display unit displays an edit screen 300B of FIG. 5 represented by the edit screen information. On the edit screen 300B, the inserted image data 304 is at the location of the cursor 302 on the edit screen 300A (that is, the location of the beginning of the character string of the second line). Therefore, the user can see that the image data 304 has been inserted at the location of the cursor 302, by viewing the edit screen 300B.

In this case A, when the SP server 100 inserts the image data at the target location of the target file (in other words, when the SP server 100 has acquired the insertion request from the relay server 50), the PC 70 and the SP server 100 does not have to be in the first log-in state. Even in this case, the SP server 100 can insert the image data at the target location (that is, the location of the cursor 302 on the edit screen 300A of FIG. 5), represented by the target location information, in the target file. However, in this case, since the PC 70 and the SP server 100 are not in the first log-in state, the SP server 100 cannot supply the edit screen information for the target file with the image data inserted therein, to the PC 70 (that is, the SP server 100 does not perform the process of STEP S70).

As described above, in this case A, by using the PC 70, the user can access a target file stored in a file storage server and designate a target location, as an image data insertion location, in the target file. Therefore, by using the PC 70, the user can easily designate a target location in a target file, and thus easily perform work for inserting image data at the target location in the target file.

Also, in this case A, in a situation where the PC 70 is displaying the edit screen 300A (see FIG. 5) of the target file by using the first log-in state, the relay server 50 establishes the second log-in state by using the same user information as the user information used during establishment of the first log-in state, and provides the insertion request to the SP server 100 by using the second log-in state. When the SP server 100 acquires the insertion request from the relay server 50, it inserts the image data at the target location (that is, the cursor location) in the target file. That is, in a situation where the user is accessing the target file through the PC 70 by using the specific user information, the corresponding user can perform the scanned-image insertion operation of STEP S40 on the MFP 10 by using the specific user information, thereby causing the image data to be inserted at the target location in the target file which the corresponding user is editing through the PC 70.

In the above described case A, the relay server 50 acquires the file name of the file which is being edited, by using the specific user information, and then acquires information on the location of the cursor in the file which is being edited. However, the relay server 50 may acquire the file name and the cursor location information by one request.

Although the case A has been described on the assumption that the relay server 50 can acquire the location of the cursor from the SP server 100, in some cases, the relay server 50 may be unable to acquire the location of the cursor from the SP server 100. Now, with reference to FIG. 6, a case B for inserting image data in a file will be described. The case B is the same as the case A in the basic process flow, but is different from the case A in that image data is inserted in a target file stored in the SP server 110, not in the SP server 100.

Unlike the SP server 100, the SP server 110 of this case B is configured so as to be unable to provide cursor location information to the relay server 50 even if acquiring a cursor location information request (STEP S52) from the relay server 50 (that is, the SP server 110 does not support a function of providing cursor location information).

The processes of the individual devices up to STEP S52 are identical to those of the case A except that the SP server 110 is used in place of the SP server 100.

After providing a cursor location information request to the SP server 110 in STEP S52, the CPU 62 of the relay server 50 cannot acquire cursor location information from the SP server 110 for a predetermined period. In this case, after the predetermined period elapses, in STEP S56, the CPU 62 provides a scan instruction to the MFP 10.

When the CPU 30 of the MFP 10 acquires the scan instruction from the relay server 50, in STEP S58, the CPU controls the scanner unit 20 such that the scanner unit scans a document. As a result, image data is generated. Subsequently, in STEP S60, the CPU 30 provides the generated image data to the relay server 50.

When the CPU 62 of the relay server 50 acquires the image data from the MFP 10, in STEP S100, the CPU provides an insertion request for requesting that the image data should be inserted at the location of the end of the data string of the target file, to the SP server 110.

Here, the location of the end of the data string of the target file is described with reference to an edit screen 400A of FIG. 5. The edit screen 400A is an edit screen which is being displayed on the display unit 74 of the PC 70 at that moment. The location of the end of the data string is a location 403 after "L" of the character string of the second line.

The SP server 110 acquires the insertion request. Subsequently, in STEP S102, the SP server 110 inserts the image data at the location of the end of the data string (that is, the location 403 on the edit screen 400A of FIG. 5) in the target file, regardless of the location of a cursor 402 of FIG. 5. Also, even in this case B, similarly in the case A, when the SP server 110 inserts the image data at the end of the data string of the target file in STEP S102 (in other words, when the SP server 110 has acquired the insertion request from the relay server 50), the PC 70 and the SP server 110 does not have to be in the first log-in state. Subsequently, in STEP S104, the SP server 110 provides OK information representing that the insertion has been completed, to the relay server 50.

When the CPU 62 of the relay server 50 acquires the OK information, in STEP S104, the CPU provides completion screen information stored in advance in the memory 64, to the MFP 10.

When the CPU 30 of the MFP 10 acquires the completion screen information, the CPU controls the display unit 14 such that the display unit displays a completion screen represented by the completion screen information.

Also, when the image data insertion of STEP S102 is completed, in STEP S108, the SP server 110 provides edit screen information for the target file with the image data inserted therein, to the PC 70.

When the CPU 80 of the PC 70 acquires the edit screen information, the CPU controls the display unit 74 such that the display unit displays an edit screen 400B of FIG. 5 represented by the edit screen information. On the edit screen 400B, the inserted image data 404 is at the location 403 of the end of the data string on the edit screen 400A. Therefore, the user can see that the image data 404 has been inserted at the location 403 of the end of the data string, by viewing the edit screen 400B.

According to this case B, in a case of inserting image data in a target file stored in the SP server 110 which is an SP server incapable of providing cursor location information to the relay server 50, it is possible to insert image data at an appropriate location.

On the assumption that there is a possibility that it is impossible to acquire cursor location information, other information representing an image insertion location may be treated as target location information for image insertion. In a case C, the relay server 50 acquires mark location information representing the location of a predetermined Insert mark (that is, a character string), instead of cursor location information, from the SP server 100.

Even in this case C, between the CPU 80 of the PC 70 and the SP server 100, processes identical to STEPS S10 to S22 of FIG. 4 are performed. During the processes identical to STEPS S10 to S22, in STEP S15, the CPU 80 of the PC 70 establishes a first log-in state with the SP server 100.

When the CPU 80 of the PC 70 acquires edit screen information (STEP S22) from the SP server 100, the CPU controls the display unit 74 such that the display unit displays an edit screen represented by the edit screen information. Subsequently, in STEP S80, the user performs an operation for inputting the Insert mark (see a reference symbol "502" of FIG. 5) which is a predetermined character string representing a location where the image data will be inserted, by operating the user interface 12. In this case, in STEP S82, the PC 70 provides mark location information representing the location of the Insert mark on the edit screen, to the SP server 100.

When the SP server 100 acquires the mark location information, in STEP S84, it provides edit screen information reflecting the Insert mark location represented by the mark location information, to the PC 70.

When the CPU 80 of the PC 70 acquires the edit screen information from the SP server 100, the CPU controls the display unit 74 such that the discharge unit displays an edit screen 500A of FIG. 5. The edit screen 500A includes a character string "ABCDEF" in the first line, and a character string "GHIJKL" in the second line. The Insert mark 502 is located at the beginning portion of the second line (that is, before "G").

Subsequently, in STEPS S40 to S50, processes identical to STEPS S40 to S50 of the case A are performed. In this process, in STEP S47, between the CPU 62 of the relay server 50 and the SP server 100, a second log-in state is established.

When the CPU 62 of the relay server 50 acquires the file name (STEP S50) from the SP server 100, in STEP S90, the CPU provides a mark location information request for requesting mark location information representing the location of the Insert mark, to the SP server 100.

When the SP server 100 acquires the mark location information request from the relay server 50, in STEP S92, the SP server provides the mark location information acquired from the PC 70 in STEP S82, to the relay server 50. Also, the mark location information which is provided to the relay server 50 in STEP S92 represents the current location of the Insert mark 502 on the edit screen 500A (see FIG. 5) displayed on the display unit 74 of the PC 70.

The CPU 62 of the relay server 50 acquires the mark location information. Subsequently, in STEP S56, the CPU 62 provides a scan instruction to the MFP 10.

When the CPU 30 of the MFP 10 acquires the scan instruction from the relay server 50, in STEP S58, the CPU controls the scanner unit 20 such that the scanner unit scans a document. As a result, image data is generated. Subsequently, in STEP S60, the CPU 30 provides the generated image data to the relay server 50.

When the CPU 62 of the relay server 50 acquires the image data from the MFP 10, in STEP S62, the CPU provides an insertion request for requesting that the image data should be inserted at the location of the Insert mark in the target file, to the SP server 100. Even in this case C, the insertion request which is provided in STEP S62 includes the file name of the target file acquired in STEP S50, target location information designating a target location where the image data should be inserted, and the image data acquired in STEP S60. The target location which is represented by the target location information is the Insert mark location which is represented by the mark location information acquired in STEP S92.

The SP server 100 acquires the insertion request. Subsequently, in STEP S64, the SP server 100 inserts the image data at the target location (that is, the location of the Insert mark 502 on the edit screen 500A of FIG. 5), which is represented by the target location information, in the target file. Also, even in this case C, similarly in this case A, when the SP server 100 inserts the image data at the target location of the target file (in other words, when the SP server 100 has acquired the insertion request from the relay server 50), the PC 70 and the SP server 100 does not have to be in the first log-in state. Subsequently, in STEP S66, the SP server 100 provides OK information representing that the insertion has been completed, to the relay server 50.

Thereafter, in STEPS S68 and S70, processes identical to STEPS S68 and S70 of the case A are performed. If the CPU 80 of the PC 70 acquires the edit screen information in STEP S70, the CPU controls the display unit 74 such that the display unit displays an edit screen 500B of FIG. 5 represented by the edit screen information. On the edit screen 500B, the inserted image data 504 is at the location of the Insert mark 502 on the edit screen 500A (that is, the location of the beginning of the second line). Therefore, the user can see that the image data 504 has been inserted at the location of the Insert mark 502, by viewing the edit screen 500B.

In this case C, the user can input the Insert mark at a desired image data insertion location regardless of the location of the cursor while viewing the edit screen 500A displayed on the display unit 74. As a result, it is possible to insert the image data at a location desired by the user.

Also, in this case C, mark location information is acquired instead of cursor location information of case A. In a modification, in the case A, in a case where the CPU 62 of the relay server 50 cannot cursor location information, the CPU may attempt to acquire mark location information. If the CPU 62 acquires mark location information, it may provide an insertion request for requesting that image data should be inserted at a location represented by the mark location information, to the SP server 100. Meanwhile, in a case where the CPU 62 cannot acquire mark location information, like in the case B, the CPU may provide an insertion request for requesting that image data should be inserted at a predetermined location (the location at the end of the data string), to the SP server 100.

In the case A, the relay server 50 acquires the file name of the file which is being edited, by using the specific user information, and then acquires information on the location of the cursor in the file which is being edited. However, the relay server 50 may issue an image data insertion request without acquiring those information items from the SP server 100. With reference to FIG. 8, a case D for inserting image data in a file will be described. The case D is a modification of the case A, and thus will be described with a focus on differences from the case A.

Even in this case D, between the CPU 80 of the PC 70 and the SP server 100, processes identical to STEPS S10 to S26 of FIG. 4 are performed. During the processes identical to STEPS S10 to S26, in STEP S15, the CPU 80 of the PC 70 establishes a first log-in state with the SP server 100.

Subsequently, in STEPS S40 to S46, processes identical to STEPS S40 to S46 of the case A are performed. Even in this case D, if the SP server 100 determines in STEP S46 that the authentication is successful, in STEP S47, between the CPU 62 of the relay server 50 and the SP server 100, a second log-in state is established.

In this case D, if the second log-in state is established in STEP S47, in STEP S75, the SP server 100 provides OK information representing that the second log-in state has been established, to the relay server 50.

The CPU 62 of the relay server 50 acquires the OK information from the SP server 100. Subsequently, in STEP S56, the CPU 62 provides a scan instruction to the MFP 10.

When the CPU 30 of the MFP 10 acquires the scan instruction from the relay server 50, in STEP S58, the CPU controls the scanner unit 20 such that the scanner unit scans a document. As a result, image data is generated. Subsequently, in STEP S60, the CPU 30 provides the generated image data to the relay server 50.

When the CPU 62 of the relay server 50 acquires the image data from the MFP 10, in STEP S62, the CPU provides an insertion request for requesting that the image data should be inserted at the location of the cursor in the target file, to the SP server 100. In the case D, the insertion request which is provided in STEP S62 includes the image data acquired in STEP S60 but does not include target location information and a file name.

The SP server 100 acquires the insertion request. Subsequently, in STEP S64, the SP server 100 inserts the image data at the target location (that is, the location of the cursor 302 on the edit screen 300A of FIG. 5), which is represented by the target location information, in the target file. In this case D, since the insertion request which is provided in STEP S62 does not include target location information and a file name, in order for the SP server 100 to specify a target file and a target location, at the time of STEP S64, the CPU 80 of the PC 70 and the SP server 100 need to be in the first log-in state. Subsequently, in STEP S66, the SP server 100 provides OK information representing that the insertion has been completed, to the relay server 50.

Thereafter, in STEPS S68 and S70, processes identical to STEPS S68 and S70 of the case A are performed.

In this case D, the insertion request which is provided in STEP S62 includes the image data acquired in STEP S60 but does not include target location information and a file name. That is, in this case D, the relay server 50 does not need to acquire a file name and cursor location information from the SP server 100. For this reason, a processing load on the CPU 62 is reduced.

In each above described case, a process for inserting image data in an existing file stored in an SP server has been described. However, it is also possible to store a file newly generated based on scanned data, in an SP server. Now, with reference to FIG. 5, a case E for newly generating a file with image data inserted therein will be described.

In STEP S120, the user performs a new-file generation operation for newly generating a file including image data which is generated by scanning a document, by operating the user interface 12 of the MFP 10. The new-file generation operation also includes an operation for selecting specific user information. At this time, the CPU 30 of the MFP 10 displays a selection screen for selecting whether to insert image data in an existing file (that is, to perform an image inserting function) or to generate a new file (that is, to perform a new-file generating function) in order to upload the image data to the SP server 100, on the display unit 14. The user selects generation of a new file (that is the new-file generating function) on that selection screen. Also, in the above described cases A to D, the user selects insertion of image data in an exiting file (that is, the image inserting function). Also, in this case E, at the time of STEP S120, the CPU 80 of the PC 70 and the SP server 100 may or may not be in the first log-in state.

In this case, in STEP S122, the CPU 30 of the MFP 10 provides user information selected in the new-file generation operation, to the relay server 50.

If the relay server 50 acquires the specific user information from the MFP 10, in STEP S124, it provides a log-in request including the acquired specific user information, to the SP server 100.

If the SP server 100 acquires the specific user information from the relay server 50, it performs authentication using the acquired specific user information. Since the specific user information acquired from the relay server 50 in STEP S124 by the SP server 100 has been already stored in the SP server 100, in STEP S128, the SP server 100 determines that the authentication is successful.

Therefore, in STEP S130, the CPU 62 of the relay server 50 establishes a second log-in state with the SP server 100.

In this case E, if the second log-in state is established in STEP S130, in STEP S132, the SP server 100 provides OK information representing that the second log-in state has been established, to the relay server 50.

The CPU 62 of the relay server 50 acquires the OK information from the SP server 100. Subsequently, in STEP S134, the CPU 62 provides a scan instruction to the MFP 10.

When the CPU 30 of the MFP 10 acquires the scan instruction from the relay server 50, in STEP S136, the CPU controls the scanner unit 20 such that the scanner unit scans a document. As a result, image data is generated. Subsequently, in STEP S138, the CPU 30 provides the generated image data to the relay server 50.

When the CPU 62 of the relay server 50 acquires the image data from the MFP 10, in STEP S140, the CPU provides a new-file generation request for requesting that a new file including the image data should be newly generated, to the SP server 100. The new-file generation request which is provided in STEP S140 includes the image data acquired in STEP S138.

The SP server 100 acquires the new-file generation request. Subsequently, in STEP S142, the SP server 100 generates a new file including the image data (see an edit screen 600 of FIG. 5). The SP server 100 stores the generated new file in the file storage area 102, in association with the user ID included in the specific user information. Subsequently, in STEP S144, the SP server 100 provides OK information representing that the file generation has been completed, to the relay server 50.

When the CPU 30 of the MFP 10 acquires the completion screen information, the CPU controls the display unit 14 such that the display unit displays a completion screen represented by the completion screen information. The completion screen includes a message representing that the new file including the image data has been generated. Therefore, the user can see that the new file including the image data has been generated, by viewing the completion screen.

Thereafter, the user can access the generated new file stored in the SP server 100, by using the PC 70, thereby capable of making the display unit 74 display the edit screen 600 of FIG. 5. On the edit screen 600, there is only the inserted image data 602. Therefore, the user can confirm the content of the new file including the image data 602 by viewing the edit screen 600.

According to this case E, in a case where the user desires to generate a new file including image data, the relay server 50 can make the SP server 100 appropriately generate a new file including the image data.

The relay server 50, the SP servers 100 and 110, and the PC 70 are examples of a control device, a file storage server, and a terminal device, respectively. The MFP 10 is an example of a scanner unit. The relay server 50 is an example of a specific server. A target file is an example of a first file. The insertion request of STEP S62 of FIG. 4 or 7 is an example of a first insertion request. The insertion request of STEP S62 of FIG. 8 and the insertion request of STEP S100 of FIG. 6 are examples of a second insertion request. The image data which is generated in STEP S58 of FIG. 4, 6, 7, or 8 is an example of first scanned data or target scanned data. The specific user information is an example of predetermined user information. The cursor location information and the mark location information are examples of target location information. The location 403 of FIG. 5 is an example of a predetermined location. The Insert mark is an example of a predetermined character string. The file which is generated in the case E is an example of a second file. The image data which is generated in STEP S136 of FIG. 9 is an example of second scanned data. The new-file generation request of STEP S140 is an example of a storage request.

STEP S58 of FIGS. 4, 6, 7, and 8 and STEP S136 of FIG. 9 are examples of a process which a scanning control unit performs. STEP S62 of FIGS. 4, 7, and 8 and STEP S100 of FIG. 6 are examples of a process which an insertion request providing unit performs. The file name Acquisition of STEP S50 of FIG. 4, 6, or 7 is an example of a process which a file specifying unit performs. The cursor location acquisition of STEP S52 of FIG. 4 and the mark location information acquisition of STEP S92 of FIG. 7 are examples of a process which a target location information acquiring unit performs.

The process of STEP S12 of FIG. 4 is an example of a process which an accessing unit performs. STEP S24 of FIG. 4 and STEP S82 of FIG. 7 are examples of a process which a designating unit performs. STEP S60 of FIG. 4, 6, 7, or 8 is an example of a process which a first scanned data providing unit performs.

Figure 10:
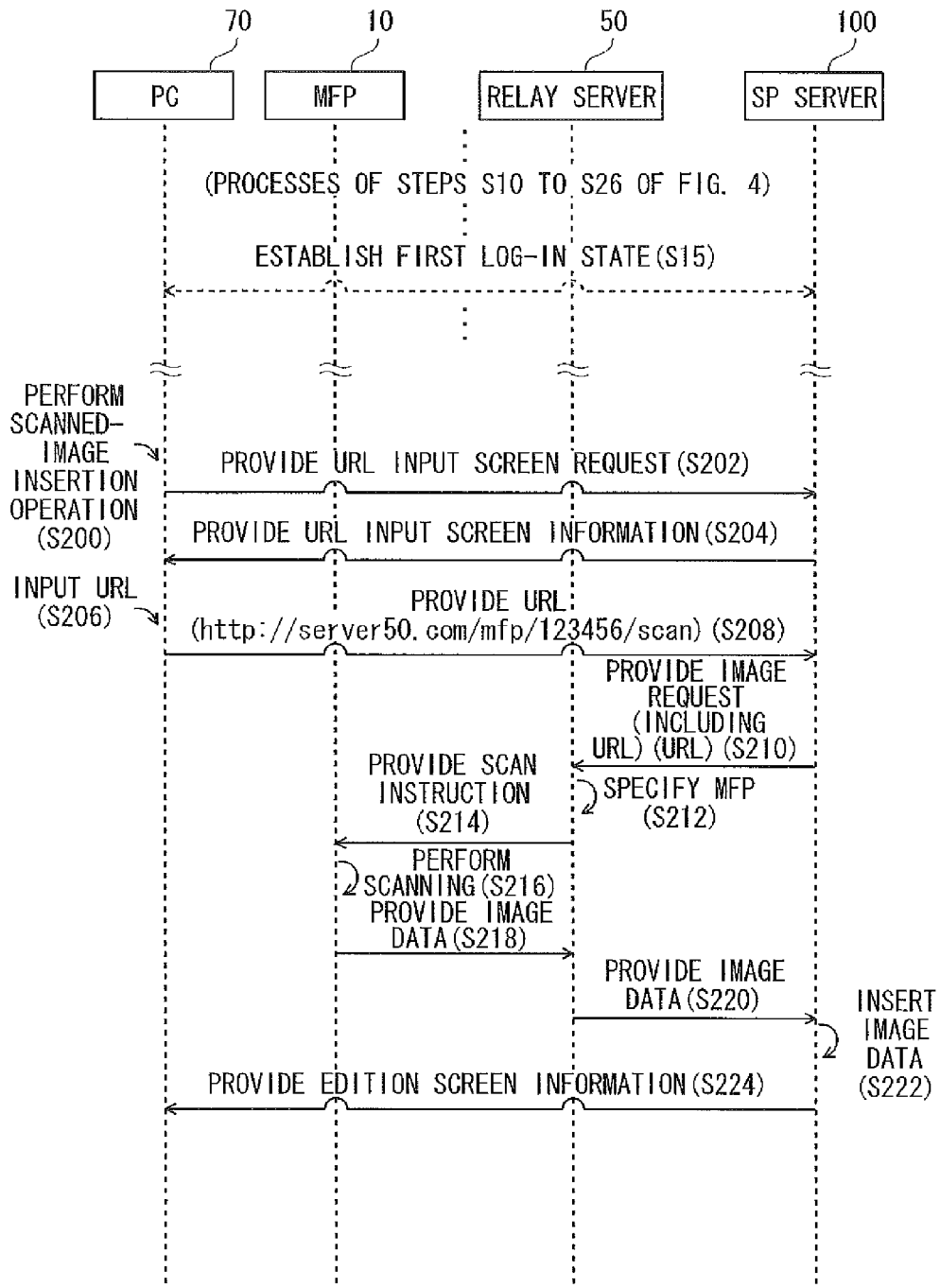
FIG. 10 shows a sequence diagram of a case F of inserting image data in a file.

Next, a second embodiment will be described with a focus on differences from the first embodiment. A case F of FIG. 10 also is a case for inserting image data in a file like the case A of the first embodiment; however it is different from the case A of the first embodiment in that a second log-in state is not established between the relay server 50 and the SP server 100.

In this case F, between the CPU 80 of the PC 70 and the SP server 100, processes identical to STEPS S10 to S26 of FIG. 4 are performed. During the processes identical to STEPS S10 to S26, in STEP S15, the CPU 80 of the PC 70 establishes a first log-in state with the SP server 100.

Subsequently, in the state where the PC 70 and the SP server 100 are in the first log-in state and the edit screen 300A for the target file is being displayed on the display unit 74, in STEP S200, the user performs a scanned-image insertion operation by operating the user interface 12 of the MFP 10. In STEP S202, the CPU 80 of the PC 70 provides a URL (an abbreviation for Uniform Resource Locator) input screen request to the SP server 100.

When the SP server 100 acquires the URL input screen request, in STEP S204, the SP server 100 provides URL input screen information stored therein, to the PC 70.

When the CPU 80 of the PC 70 acquires the URL input screen information, the CPU controls the display unit 74 such that the discharge unit displays a URL input screen represented by the URL input screen information. The URL input screen is a screen for inputting a URL which is location information representing the storage area of image data to be inserted. In the present embodiment, even in a case where image data to be inserted has not been generated yet (that is, image data to be inserted has not been stored), the user can input a URL determined according to a predetermined rule, on the URL input screen. Hereinafter, a case where the user inputs a URL determined according to the predetermined rule, on the URL input screen in this case F will be described.

In STEP S206, the user performs a URL input operation on the URL input screen by operating the user interface 72 of the PC 70. In this case F, the URL input operation includes an operation for inputting the URL of the relay server 50 which the user already knows. In an example of this case F, the URL of the relay server 50 is represented by a character string "http://server50.com/mfp/123456/scan". In this character string, a character string part "123456" is communication device identification information (that is, identification information representing the MFP 10). Also, a character string "mfp" is information representing the model (that is, MFP) of the MFP 10. Further, a character string "scan" is information representing a function (that is, scanning) which the MFP 10 should perform. In this case, subsequently, in STEP S208, the CPU 80 of the PC 70 provides the input URL (that is, "http://server50.com/mfp/123456/scan") to the SP server 100.

The SP server 100 acquires the URL from the PC 70. Subsequently, in STEP S210, the SP server 100 specifies the relay server 50 indicated by the URL, based on the acquired URL, and provides an image request to the specified relay server 50. The image request is a request for requesting image data provision, and includes the URL acquired from the PC 70.

The CPU 62 of the relay server 50 acquires the image request. Subsequently, in STEP S212, based on the communication device identification information (that is, "123456")

included in the URL included in the acquired image request, the CPU 62 specifies the MFP 10 as a communication device which should perform scanning, from a plurality of communication devices capable of communication with the relay server 50. Subsequently, in STEP S214, the CPU 62 provides a scan instruction to the MFP 10.

When the CPU 30 of the MFP 10 acquires the scan instruction from the relay server 50, in STEP S216, the CPU controls the scanner unit 20 such that the scanner unit scans a document. As a result, image data is generated. Subsequently, in STEP S218, the CPU 30 provides the generated image data to the relay server 50.

When the CPU 62 of the relay server 50 acquires the image data from the MFP 10, in STEP S220, the CPU provides the image data to the SP server 100.

The SP server 100 acquires the image data from the relay server 50. Subsequently, in STEP S222, the SP server 100 inserts the image data at the target location (that is, the location of the cursor 302 on the edit screen 300A of FIG. 5) in the target file. In this case, in STEP S224, the SP server 110 provides edit screen information for the target file with the image data inserted therein, to the PC 70.

When the CPU 80 of the PC 70 acquires the edit screen information, the CPU controls the display unit 74 such that the display unit displays the edit screen 300B of FIG. 5 represented by the edit screen information.

According to this case F, the user can insert image data at a target location in a target file by operating the PC 70. That is, according to this case F, the user does not need to operate the MFP 10. Therefore, according to the present embodiment, by using the PC 70, the user can easily designate a target location in a target file, and thus easily perform work for inserting image data at the target location in the target file.

The scanned-image insertion operation of STEP S200 is an example of an insertion operation. The URL is an example of identification information. The image request of STEP S210 is an example of a scanned data request. STEP S208 is an example of a process which an identification information providing unit performs. The image request acquisition of STEP S210 is an example of a process which a scanned data request acquiring unit performs.

Subsequently, a third embodiment will be described with a focus on differences from the second embodiment. A case G of FIG. 11 is a case where a second log-in state is not established between the relay server 50 and the SP server 100, similarly in the case F of the second embodiment, and is different from the case F of the second embodiment in some processes.

In this case G, between the CPU 80 of the PC 70 and the SP server 100, processes identical to STEPS S10 to S26 of FIG. 4 are performed. During the processes identical to STEPS S10 to S26, in STEP S15, the CPU 80 of the PC 70 establishes a first log-in state with the SP server 100.

Subsequently, in the state where the PC 70 and the SP server 100 are in the first log-in state and the edit screen 300A for the target file is being displayed on the display unit 74, in STEP S300, the user performs a scanned-image insertion operation for inserting image data, which is generated by scanning a document, in the target file, by operating the user interface 72 of the PC 70. In this case, in STEP S302, the CPU 80 of the PC 70 controls the display unit 74 that the display unit displays a URL input screen stored in advance in the memory 32. Even in this case G, the URL input screen includes an input field for inputting the URL of a relay server (that is, the relay server 50) to relay service provided by the SP server 100 to the MFP 10.

In STEP S302, the user performs a URL input operation on the URL input screen by operating the user interface 72 of the PC 70. Even in this case G, the URL input operation includes an operation for inputting the URL of the relay server 50 which the user already knows. Even in an example of this case G, similarly in the case F, the URL of the relay server 50 is represented by a character string "http://server50.com/mfp/123456/scan". In this case, subsequently, in STEP S304, the CPU 80 of the PC 70 provides an image request for requesting image data provision, to the relay server 50 indicated by the URL input in STEP S302. The image request which is provided in STEP S304 includes the URL input in STEP S302.

The CPU 62 of the relay server 50 acquires the image request. Subsequently, in STEP S306, based on the communication device identification information (that is, "123456") included in the URL included in the acquired image request, the CPU 62 specifies the MFP 10 as a communication device which should perform scanning, from a plurality of communication devices capable of communication with the relay server 50. Subsequently, in STEP S308, the CPU 62 provides a scan instruction to the MFP 10.

When the CPU 30 of the MFP 10 acquires the scan instruction from the relay server 50, in STEP S310, the CPU controls the scanner unit 20 such that the scanner unit scans a document. As a result, image data is generated. Subsequently, in STEP S312, the CPU 30 provides the generated image data to the relay server 50.

When the CPU 62 of the relay server 50 acquires the image data from the MFP 10, in STEP S314, the CPU provides the image data to the PC 70.

When the CPU 80 of the PC 70 acquires the image data from the relay server 50, in STEP S316, the CPU provides the image data to the SP server 100.

The SP server 100 acquires the image data from the relay server 50. Subsequently, in STEP S318, the SP server 100 inserts the image data at the target location (that is, the location of the cursor 302 on the edit screen 300A of FIG. 5) represented by the target location information, in the target file. In this case, in STEP S320, the SP server 110 provides edit screen information for the target file with the image data inserted therein, to the PC 70.

When the CPU 80 of the PC 70 acquires the edit screen information, the CPU controls the display unit 74 such that the display unit displays the edit screen 300B of FIG. 5 represented by the edit screen information.

According to this case G, the user can insert image data at a target location in a target file by operating the PC 70. That is, according to this case G, the user does not need to operate the MFP 10. Therefore, according to the present embodiment, by using the PC 70, the user can easily designate a target location in a target file, and thus easily perform work for inserting image data at the target location in the target file.

The scanned-image insertion operation of STEP S300 is an example of the insertion operation. The image request of STEP S304 is an example of the scanned data request. STEP S304 is an example of a process which a scanned data request providing unit performs. The image data acquisition of STEP S314 is an example of a process which a scanned data acquiring unit performs. STEP S316 is an example of a process which a second scanned data providing unit performs. The image request acquisition of STEP S304 is an example of the process which the scanned data request acquiring unit performs.

Although specific examples of the present disclosure have been described, they are merely illustrative and do not limit the scope of claims. In technologies to be described in claims, examples obtained by changing or modifying the above described specific examples are included. Modifications of the above described embodiments will be listed below.

A configuration according to a first modification will be described as follows. According to the above described cases A to D, when the user selects one file name included in the file list screen by operating the user interface 72 of the PC 70, the user selects the file name of a first type file (see STEP S18 of FIG. 4). However, the present disclosure is not limited thereto. When the user selects one file name included in the file list screen, the user may select the file name of a second type file. In the present modification, even in a case where the file name of a second type file is selected, the processes of each case of each above described embodiment may be performed. In this case, a second type file which is selected may be an example of the target file or the first file.

A configuration according to a second modification will be described as follows. In the above described cases A to D and G, in the state where the PC 70 and the SP server 100 are in the first log-in state and the edit screen 300A for the target file is being displayed on the display unit 74, if the user performs a scanned-image insertion operation (STEP S40 of FIGS. 4, 6, and 7, STEP S200 of FIG. 10, and STEP S300 of FIG. 11), the image data is inserted in the target file. However, the present disclosure is not limited thereto. In each above described case, at the time when the user performs the scanned-image insertion operation by the user interface 12 of the MFP 10, the PC 70 and the SP server 100 does not have to be in the first log-in state, and the edit screen 300A of the target file may not be displayed on the display unit 74. That is, at the time when the user performs the scanned-image insertion operation by the user interface 12 of the MFP 10, the target file may not be edited by the PC 70. In this case, the SP server 100 or 110 may insert the image data at the cursor location (or the Insert mark location or the location of the end of the data string) in the target file, at the time when the PC 70 and the SP server 100 are disconnected. The target file of this case also is an example of the first file or the target file.

A configuration according to a third modification will be described as follows. In the above described cases A to D, the specific user information is used not only for establishing a first log-in state but also for establishing a second log-in state. However, the present disclosure is not limited thereto. Different user information items may be used to establish a first log-in state and a second log-in state, respectively. For example, a situation may occur where a first user has established a first log-in state between the PC and the SP server 100 by using first user information, and is accessing a specific file through the PC. In this situation, in a case where a second user establishes a second log-in state between the MFP and the SP server 100 by using second user information, and provides image data from the MFP to the SP server 100 through the relay server 50, the SP server 100 may insert image data acquired from the relay server 50 by using the second log-in state, in the specific file which the first user is accessing by using the first log-in state.

A configuration according to a fourth modification will be described as follows. In the first embodiment, the CPU 62 of the relay server 50 provides a scan instruction to the MFP 10, and acquires image data generated by the MFP 10, from the MFP 10, and provides an insertion request including the corresponding image data, to the SP server 100. Alternatively, the CPU 62 of the relay server 50 may provide an insertion request instruction including the name of a file in which the image data will be inserted, and target location information, in addition to a scan instruction. If the CPU 30 of the MFP 10 acquires the scan instruction, it may perform scanning, thereby generating image data. Also, if the insertion request instruction is acquired, the CPU 30 may transmit an insertion instruction including the generated image data, directly to the SP server 100, not through the relay server 50. That is, the CPU 62 of the relay server 50 may provide template information (that is, a file name, target location information, and so on) necessary for generating an insertion request, to the MFP 10, and the CPU 30 of the MFP 10 may generate an insertion request including image data by using the template information, and provide the insertion request to the SP server 100.

A configuration according to a fifth modification will be described as follows. The MFP 10 and the relay server 50 may be configured as one device. In this case, the combination of the MFP 10 and the relay server 50 is an example of the control device. Also, the MFP 10 may be configured so as to be able to perform the same function as that of the relay server 50. In this case, the MFP 10 is an example of the control device.

A configuration according to a sixth modification will be described as follows. In the above described case B, if the CPU 62 of the relay server 50 acquires image data from the MFP 10, in STEP S100 of FIG. 6, it provides an insertion request for requesting that the image data should be inserted at the location of the end of a data string of a target file, to the SP server 110. An insertion request of the case B is not limited to an insertion request for requesting that image data should be inserted at the location of the end of a data string of a target file, and may be an insertion request for requesting that image data should be inserted at a predetermined location in a target file. Therefore, for example, an insertion request of the case B may be an insertion request for requesting that image data should be inserted at the location of the beginning of a data string of a target file. Generally, in a case where it is impossible to acquire target location information from the file storage server, the insertion request providing unit needs only to provide the second insertion request for inserting the first scanned data at the predetermined location in the first file, to the file storage server.

A configuration according to a seventh modification will be described as follows. According to each above described embodiment, the CPU 30 of the MFP 10 and the CPU 62 of the relay server 50 perform processes according to software, whereby the processes of each of the cases A to G are performed. Alternatively, at least a part of the processes of each of the cases A to G may be implemented by hardware such as logic circuits.

The technical elements explained in the present disclosure provide technical utility either independently or through various combinations. The present disclosure is not limited to the combinations described at the time the claims are filed. Further, the purpose of the examples illustrated by the present disclosure is to satisfy multiple objects simultaneously, and satisfying any one of those objects gives technical utility to the present disclosure.

Control methods and computer programs for implementing the above described control device, and computer-readable storage media with the corresponding computer programs may also be new and useful. Also, control methods and computer programs for implementing the above described terminal device, and computer-readable storage media with the corresponding computer programs may be new and useful.

What is claimed is:

1. A control device for controlling a scanner unit, the control device comprising:
 a communication interface connectable with a network to establish communication with a file storage server through the network;
 a processor; and
 memory storing computer readable instructions that, when executed by the processor, causing the control device to perform:
 scanning control processing of controlling the scanner unit, when a first instruction is received from a user to insert a first scanned data in a first file stored in the file storage server, to scan a document to generate the first scanned data;
 insertion request providing processing of providing a first insertion request to the file storage server through the communication interface, the first insertion request requesting the file storage server to insert the first scanned data at a target location in the first file, the target location being a location designated by the user through a terminal device that is configured separately from the control device;
 target location information acquiring processing of acquiring, from the file storage server through the communication interface, target location information representing the target location in the first file; and
 determination processing of determining whether the target location information is acquired from the file storage server in the target location information acquiring processing;
 wherein, in the insertion request providing processing, providing the first insertion request further includes the target location information to the file storage server through the communication interface when determined that the target location information is acquired from the file storage server in the determination processing.

2. The control device according to claim 1,
 wherein the memory stores the computer readable instructions that, when executed by the processor, further causing the control device to perform:
 file specifying processing of specifying the first file to which the terminal device is currently accessing, from one or more files stored in the file storage server, based on user information with which the terminal device accesses the first file;
 in the insertion request providing process, providing the first insertion request for inserting the first scanned data at the target location in the specified first file, to the file storage server.

3. The control device according to claim 1,
 wherein the memory stores the computer readable instructions that, when executed by the processor, further causing the control device to perform:
 in the insertion request providing processing, providing a second insertion request for inserting the first scanned data at the predetermined location in the first file to the file storage server when determined that the target location information is not acquired from the file storage server in the determination processing.

4. The control device according to claim 1,
 wherein the target location includes a location of a pointer in the first file displayed on the terminal device at the time the first instruction is made by the user.

5. The control device according to claim 1,
 wherein the target location includes a location of a predetermined character string in the first file.

6. The control device according to claim 1,
 wherein the memory stores the computer readable instructions that, when executed by the processor, further causing the control device to perform:
 in the scanning control processing, controlling the scanner unit, when a second instruction is received from the user to store a second file containing second scanned data, to scan a document to generate the second scanned data; and
 storing request providing processing of providing storing request to the first storage server through the communication interface, the storing request requesting the file storage server to store the second file containing the second scanned data as a new file.

7. The control device according to claim 1,
 wherein the control device is configured as a server apparatus separate from a scanner apparatus provided with the scanner unit.

8. An image processing system comprising:
 a terminal device; and
 a control device that is configured separately from the terminal device,
 wherein the terminal device includes:
 a user input device that receives a command input by a user;
  a first communication interface connectable with a network to establish communication with a file storage server through a network;
 a first processor; and
 first memory storing computer readable instructions that, when executed by the first processor, causing the terminal device to perform:
 accessing processing of accessing a target file stored in the file storage server through the first communication interface with a predetermined user information; and
 designating processing of designating a target location in the target file, when the user input device receives an edit operation input by the user for instructing editing of the target file through the user input device, in a state where the terminal device is accessing the target file, and
 wherein the control device includes:
 a second communication interface connectable with the network to establish communication with the file storage server and the terminal device through the network;
 a second processor; and
 second memory storing computer readable instructions that, when executed by the second processor, causing the control device to perform:
 scanning control processing of controlling a scanner to scan a document to generate target scanned data;
 first scanned data providing processing of providing the target scanned data to the file storage server through the second communication interface for inserting the target scanned data at the target location in the target file; and
 identification information providing processing of providing identification information for identifying the control device to the file storage server, when the user input device receives an insertion operation input by the user for inserting the target scanned data at the target location in the target file, in a state where the terminal device has designated the target location in the target file, the identification information being used by the file storage server for supplying a scanned data request from the file storage server to the control device, and wherein the second memory stores computer readable instructions that, when executed by the second processor, further causing the control device to perform:

scanned data request acquiring processing of acquiring the scanned data request from the file storage server;

in the scanning control processing, controlling the scanner unit to scan the document and to generate the target scanned data when the scanned data request is acquired in the scanned data request acquiring processing; and in the first scanned data providing processing, providing the target scanned data to the file storage server not through the terminal device.

9. A non-transitory computer readable recording medium storing computer readable instructions for a control device that controls a scanner unit and provided with a communication interface and a processor, wherein the instructions, when executed by the processor, causing the control device to perform:

scanning control processing of controlling the scanner unit, when a first instruction is received from a user to insert a first scanned data in a first file stored in the file storage server, to scan a document to generate the first scanned data;

insertion request providing processing of providing a first insertion request to the file storage server through the communication interface, the first insertion request requesting the file storage server to insert the first scanned data at a target location in the first file, the target location being a location designated by the user through a terminal device that is configured separately from the control device;

file specifying processing of specifying the first file to which the terminal device is currently accessing, from one or more files stored in the file storage server, based on user information with which the terminal device accesses the first file; and in the insertion request providing process, providing the first insertion request for inserting the first scanned data at the target location in the specified first file, to the file storage server.

10. A control device for controlling a scanner unit, the control device comprising:

a communication interface connectable with a network to establish communication with a file storage server through the network;

a processor; and memory storing computer readable instructions that, when executed by the processor, causing the control device to perform:

scanning control processing of controlling the scanner unit, when a first instruction is received from a user to insert a first scanned data in a first file stored in the file storage server, to scan a document to generate the first scanned data;

insertion request providing processing of providing a first insertion request to the file storage server through the communication interface, the first insertion request requesting the file storage server to insert the first scanned data at a target location in the first file, the target location being a location designated by the user through a terminal device that is configured separately from the control device; and file specifying processing of specifying the first file to which the terminal device is currently accessing, from one or more files stored in the file storage server, based on user information with which the terminal device accesses the first file;

in the insertion request providing process, providing the first insertion request for inserting the first scanned data at the target location in the specified first file, to the file storage server.

11. The control device according to claim 10, wherein the target location includes a location of a pointer in the first file displayed on the terminal device at the time the first instruction is made by the user.

12. The control device according to claim 10, wherein the target location includes a location of a predetermined character string in the first file.

13. The control device according to claim 10, wherein the memory stores the computer readable instructions that, when executed by the processor, further causing the control device to perform:

in the scanning control processing, controlling the scanner unit, when a second instruction is received from the user to store a second file containing second scanned data, to scan a document to generate the second scanned data; and storing request providing processing of providing storing request to the first storage server through the communication interface, the storing request requesting the file storage server to store the second file containing the second scanned data as a new file.

14. The control device according to claim 10, wherein the control device is configured as a server apparatus separate from a scanner apparatus provided with the scanner unit.

15. A non-transitory computer readable recording medium storing computer readable instructions for a control device that controls a scanner unit and provided with a communication interface and a processor, wherein the instructions, when executed by the processor, causing the control device to perform:

scanning control processing of controlling the scanner unit, when a first instruction is received from a user to insert a first scanned data in a first file stored in the file storage server, to scan a document to generate the first scanned data;

insertion request providing processing of providing a first insertion request to the file storage server through the communication interface, the first insertion request requesting the file storage server to insert the first scanned data at a target location in the first file, the target location being a location designated by the user through a terminal device that is configured separately from the control device;

target location information acquiring processing of acquiring, from the file storage server through the communication interface, target location information representing the target location in the first file; and determination processing of determining whether the target location information is acquired from the file storage server in the target location information acquiring processing;

wherein, in the insertion request providing processing, providing the first insertion request further includes the target location information to the file storage server through the communication interface when determined that the target location information is acquired from the file storage server in the determination processing.

* * * * *